Patented June 27, 1933

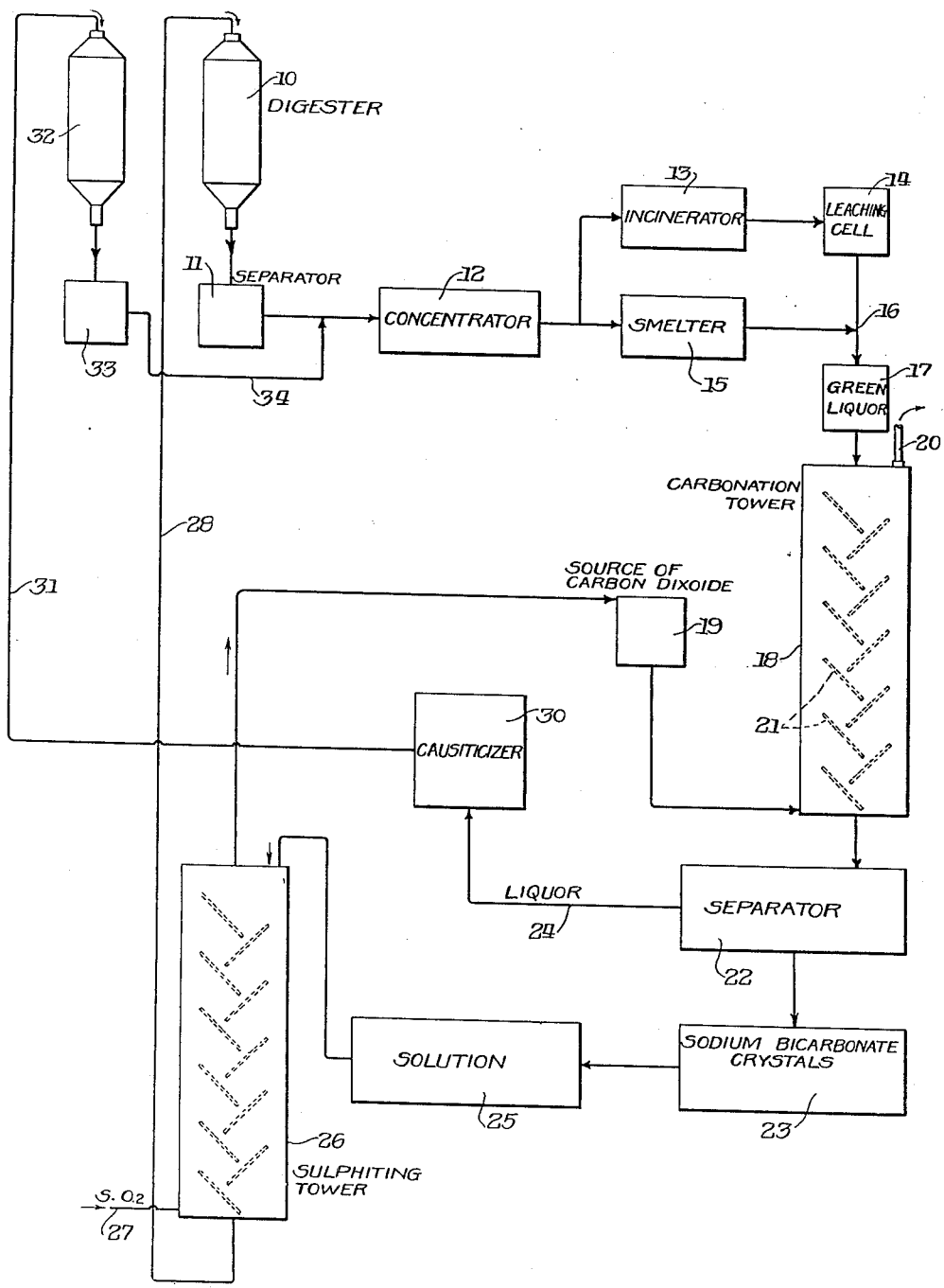

1,915,315

UNITED STATES PATENT OFFICE

WALTER F. HOFFMAN, OF CLOQUET, MINNESOTA

RECOVERY OF WASTE LIQUORS

Application filed June 17, 1929. Serial No. 371,381.

The present invention relates to the treatment of sodium carbonates containing sodium sulphide for the preparation of a liquor containing sodium carbonates and a decreased quantity of sodium sulphide; for the preparation of a liquid containing sodium carbonates and an increased quantity of sodium sulphide; and to the subsequent treatment and use of such liquors in a cyclic process for digesting cellulosic material and for recovery of the chemicals.

In the processes for cooking wood and the like with sodium-base liquors, such as the Kraft and the sulphate processes, and the sulphite and the mono-sulphite processes, and their variations, it is the general practice to recover the waste cooking liquor by incineration which yields sodium carbonate as the principle product with a considerable proportion of sodium sulphide. This incineration process may only reduce the organic matter which is present in the waste liquor to carbon, from which the sodium salts are leached forming so-called "leach liquor". In other cases the incineration is more complete and the carbon is substantially all burned away, leaving sodium salts heated to the melting point. The smelted product is then taken up with water to form a solution, which is equivalent to the leach liquor. Such liquor, whether formed by the carbonizing incineration or by the smelting process, is hereinafter referred to as "green liquor".

The green liquor consists essentially of sodium carbonate together with a substantial and usually lesser amount of sodium sulphide. Sodium sulphite, sodium sulphate, and possibly other compounds may be present in small amounts, depending in character and concentration upon the type of process from which the waste liquor is derived, and depending also upon the character of the incineration.

In a number of wood-cooking processes into which the chemicals of the green liquor may be utilized after subsequent treatment, sodium sulphide may be a beneficial agent. But in other processes, such as one in which the green liquor is sulphited to produce sodium sulphite or sodium bisulphite, sodium sulphide may react to form detrimental ingredients. When a green liquor is subjected to the action of sulphur dioxide, for example, it brings about the formation of sodium thiosulphate from the sodium sulphide which may be present. The sodium thiosulphate is a detrimental ingredient in certain cooking processes, producing dark or difficultly bleachable pulp. Furthermore, in the sulphiting of green liquors containing sodium sulphide, sulphur may be lost in the form of hydrogen sulphide, which loss is uneconomical, the lost material itself being disagreeable in odor to the point of being a nuisance.

It is one object of the present invention to prepare a sodium sulphite liquor from a green liquor, or its equivalent, without the formation of an undesirable quantity of sodium thiosulphate, or the loss of quantities of sulphur.

It is another object to treat liquor similar to green liquor in order to concentrate sodium carbonates in one part and to concentrate sodium sulphide in another part.

It is a particular object of the invention to treat liquor containing alkaline compounds of sodium, such as the carbonate or the hydroxide, having a sulphide impurity therein, with carbon dioxide to form sodium bicarbonate and permit crystallization of sodium bicarbonate in order to effect a separation of the crystals as a sodium carbonate concentrate from the liquor which becomes a sodium sulphide concentrate.

It is still another object to employ the process in combination with a number of cooking processes for the most efficient use of the chemicals involved in the processes.

Various other objects and advantages of the invention will be apparent from the following description of the invention as exemplified in the process and apparatus shown in the accompanying drawing.

In the pulp making industry no recovery process, or no cooking process, however good each may be, is practical and useful unless it can be operated in an economic cycle. The monosulphite process is a good example of this condition. A number of published articles dealing with the various monosulphite processes that have been proposed indicate that economic recovery is essential to the successful use of the process. Where other processes for cooking are run in the same mill with a monosulphite process, the recovery operations may be adapted for recovery of chemicals that may be used in one process or in another. Interrelation of processes is therefore important from an operating standpoint.

The invention may best be explained by giving as an example one method of carrying it out in such interrelated processes, but it is to be understood that the invention is not limited to the example herein given, and that it is subject to such other embodiments as may fall within the scope of the appended claims.

In the drawing 10 indicates a digester in which a sodium base cooking liquor may be employed, such as a sodium sulphite cooking liquor, preferably one containing large quantities of sodium monosulphite, or any modification of these. The waste liquor from the digester 10 is regenerated to form a high grade cooking liquor for the same process.

A separator 11 is indicated from which pulp and waste liquor from the cooking operation move in different directions. The liquor may enter a concentrator 12 to be reduced to a syrup. The concentrate may be treated (a) in a rotary incinerator 13, which discharges black ash that may be leached in a suitable cell 14, or (b) it may be moved through apparatus 15 involving a smelter. Each treatment may be carried out simultaneously in the same mill with different portions of the original waste liquor or with liquor containing the waste liquor from the digester 10. The products may be united at 16 and formed into a solution indicated at 17 containing essentially sodium carbonate with attendant sodium sulphide, the former predominating as the desirable constituent, and the latter being unavoidably present as an impurity.

The so-called "green liquor" 17 is then treated with carbon dioxide gas, as in a tower 18, into which gas from a source 19 flows upwardly against down-flowing liquor. An exit 20 is provided for effluent gas. Inclined or other suitably arranged baffles 21 are indicated so that any crystals that may form will gravitate to the bottom of the tower. A separator 22 separates the crystals from liquid. Crystals from the separator are indicated at 23, and the mother liquor is indicated at 24. As a result of the process involved, the crystals comprise chiefly sodium bicarbonate ($NaHCO_3$). Small amounts of other materials may be present, such for example as sodium sulphide, because of the adherent mother liquor. This may be controlled by the efficiency of separation, and may be reduced by washing, but for practical purposes of this example, the sulphide content may be considered sufficiently low without washing. The liquor 24 contains a decreased quantity of sodium carbonates and an increased proportion of sodium sulphides to carbonates, practically all of the sodium sulphide remaining in the liquor.

The bicarbonate crystals may now be diverted or utilized in any process where the low or nil sulphide content cannot be disadvantageous. The mother liquor may be employed in any process where the prepared liquor may use sulphide advantageously, or where it does no harm, or where conversion products of the sulphide are not harmful to the cooking process.

In the examples I have shown how the chemicals may be kept in a cycle using each in the most advantageous manner. The cycle includes the cooking of cellulosic material, recovery of waste chemicals, and regeneration of cooking liquors. The bicarbonate crystals may be dissolved at 25. The resulting solution may be treated with material containing available sulphur dioxide, such as sodium bisulphite, but preferably with sulphur dioxide gas. This may take place in an absorption tower 26 in which liquid flows down against a rising current of gas from a source of sulphur dioxide 27. The gas being acid reacts with the alkaline liquor and liberates carbon dioxide, which may be carried to the source 19 from which it may be used in carbonation. Sulphur dioxide may be introduced at such a rate that the liquors are incompletely sulphited, exactly sulphited to the normal sulphite or sodium mono-sulphite ($Na_2SO_3$), or excessively sulphited to form sodium bisulphite ($NaHSO_3$) to a partial or full extent, or otherwise varied within the skill of the art. For the purpose of the present example, I prefer to form substantially sodium monosulphite for cooking wood in the digester 10, as indicated by the flow line 28. It is of course understood that suitable supply and storage vessels (not shown) are interposed for making up the liquor to be used in digester 10.

The liquor 24 containing the sulphide may be advantageously causticized at 30, whereby sodium carbonate is converted into sodium hydroxide ($NaOH$), the sodium sulphide remaining unchanged in this step. The causticized liquor may then be employed for preparing a sulphate or Kraft cooking liquor. Its use in this way is indicated by flow line 31 to digester 32. Residual cooking liquor from digester 32 may be procured in a separator 33, and if desired mingled with the residual liquor from digester 10, as indicated by the flow line 34.

Such use and treatment of the chemicals maintains them in an efficient cycle, but some loss may occur in the process. The loss may best be made up by adding fresh soda ($Na_2C_3$) to the sulphide-free process, as at the point 35.

In order to give a detailed example of the process, I will illustrate the process specifically, beginning with a green liquor which contains 16 pounds of total soda per cu. ft. The separation produced by this invention depends upon the relative solubility of sodium carbonate, sodium bicarbonate and sodium sulphide. Conditions are chosen so that a practical separation of bicarbonate is effected by converting a solution containing a normal carbonate in part to the bicarbonate with a precipitation of sodium bicarbonate crystals. The green liquor containing 16 pounds of soda base per cu. ft. has a portion of the base present as sulphide, although a major portion is present as soda ash. For example, 70% may be as soda ash, 17% as sulphide, and the remainder as other sodium salts which do not enter into the steps of the present invention as active participants which may not be dispensed with. Carbonation with carbon dioxide gas at 80° F. generates bicarbonate in the solution, which becomes saturated with sodium bicarbonate and then precipitates crystals of sodium bicarbonate. When about 25% of the sodium carbonate has been converted into sodium bicarbonate, the crystals begin to form. Carbonation may be stopped at any point economically suitable, such for example, as at the point where 25% of the original soda remains as such. When a separation is made at this point, I have found the liquid to contain an increased proportion of sulphide to soda, and the crystals to contain a decreased proportion of sulphide to soda.

I have similarly treated more dilute liquors, such as those containing 8 and 12 pounds of soda per cu. ft. having a similar proportion of sulphide to soda. The following Table I shows the relative proportions of chemicals in the liquid phase, and Table II shows the relative proportion of chemicals in the crystal phase, after a sufficient carbonation.

Table I. (Liquid phase)

| | Pounds per cu. ft. (as soda) | | |
| --- | --- | --- | --- |
| | 16 | 12 | 8 |
| | Percent | Percent | Percent |
| $Na_2CO_3$ (Soda ash) | 25 | 26.5 | 17 |
| $NaHCO_3$ (Bicarbonate) | 8 | 16 | 30 |
| $Na_2S$ (Sulphide) | 7.5 | 9 | 7 |
| Ratio of sulphide to carbonates | .227 | .215 | .149 |

Table II. (Crystal phase)

| | Pounds per cu. ft. (as soda) | | |
| --- | --- | --- | --- |
| | 16 | 12 | 8 |
| | Percent | Percent | Percent |
| $Na_2CO_3$ (Soda ash) | 18.5 | 7.5 | 3 |
| $NaHCO_3$ (Bicarbonate) | 24 | 25 | 32.5 |
| $Na_2S$ (Sulphide) | 4.5 | 3 | 1.3 |
| Ratio of sulphides to carbonates | .106 | .092 | .037 |

From the foregoing it will be observed that the more complete separation takes place in the liquors of lower concentration. This is a disadvantage where more concentrated liquors are desired in subsequent operations. However, the lower dilutions require longer time to bring about crystal formation, and therefore much more carbon dioxide. According to particular conditions there is to be found an economic balance of advantages and disadvantages.

It has been noted that hydrogen sulphide may be released in carbonation, and it becomes more noticeable in the liquids having higher concentrations of sulphide, such as 10% of the soda present. Released sulphur gas may pass out with excess carbon dioxide and it may be absorbed by fresh liquor or more dilute liquor.

I have found that the effect of increased temperature is similar to the effect of greater dilution. Longer time for crystallization is required.

On the rate of crystallization I have found that in the more concentrated leach liquors it occurs sooner than in the more dilute liquors. At a concentration of 16 pounds of soda per cu. ft. crystallization may occur when 15% of it has been converted to bicarbonate, while at concentrations of 12 and 8 pounds respectively, crystallization may occur at 35% and 50% conversion.

From the foregoing it will be seen that I have provided a process for treating leach liquor, or liquor containing essentially a large proportion of an alkali capable of absorbing carbon dioxide, such as caustic soda, or sodium carbonate, and a proportion of sulphide, to form two portions of soda base material, in one of which the sulphide is concentrated, and in the other of which sulphide is diminished in proportion to the soda content. The rich sulphide portion may be used where the sulphide content is not harmful or where it is beneficial. The low sulphide portion may be used in a process where the sulphide would be harmful, such as the sulphiting step to form sulphites, in which it is desired to minimize the formation of thiosulphate.

It is also to be understood that sulphates and other impurities which are present in the original liquors and which are not changed to insoluble form on carbonation, are retained in the mother liquor with or like the sodium sulphide.

I claim:

1. A process of treating green liquor from an ash produced in the recovery of chemicals from a soda-sulphur base pulping process which comprises carbonating the green liquor, separating the resulting crystals of sodium bicarbonate, sulphiting the sodium bicarbonate to form a sodium sulphite, cooking cellulosic material in a liquor containing sodium sulphite so prepared, and recovering waste liquor from said cooking process through the steps providing the green liquor.

2. A process of treating green liquor from an ash produced in the recovery of chemicals from a soda-sulphur base pulping process which comprises carbonating the green liquor, separating the resulting crystals of sodium bicarbonate, sulphiting the sodium bicarbonate to form a sodium sulphite, cooking cellulosic material with a liquor containing sodium sulphite so prepared, cooking cellulosic material with a liquor containing the chemicals of the mother liquor from the bicarbonate crystals, and recovering waste liquors from said two cooking processes through the steps providing the green liquor.

3. The process of using and recovering soda base in a pulp making process employing soda-sulphur compounds which comprises cooking cellulosic material in a soda base process permitting the presence of sodium sulphide, cooking cellulosic material with a liquor containing sulphited soda, recovering waste liquors from said processes through an incineration step providing essentially a sodium carbonate product, carbonating said product in solution, separating the resulting crystals of sodium bicarbonate, preparing from the crystals a cooking liquor for the sulphited soda process, and preparing from the mother liquor a cooking liquor for the other cooking process.

4. The method of reusing soda and sulphur base chemicals for the cooking of wood and the like which comprises reducing waste-liquor to an ash containing sodium carbonate and sodium sulphide, dissolving the ash, carbonating the solution whereby insoluble sodium bicarbonate is formed, separating the sodium bicarbonate crystals from the sulphide containing liquor, sulphiting the sodium bicarbonate to form a sodium sulphite type of cooking liquor whereby the liquor is substantially free from sodium thiosulphate, and using the said cooking liquor and the soda and sulphide content of the sulphide containing liquor for the cooking of wood and the like whereby to produce waste-liquor as first above specified.

5. The method of reusing soda and sulphur base chemicals for the cooking of wood and the like which comprises reducing waste-liquor to an ash containing sodium carbonate and sodium sulphide, dissolving the ash, carbonating the solution whereby insoluble sodium bicarbonate is formed, separating the sodium bicarbonate crystals from the sulphide containing liquor, sulphiting the sodium bicarbonate to form a sodium sulphite type of cooking liquor whereby the liquor is substantially free from sodium thiosulphate, using the resulting carbon dioxide for carbonating the dissolved ash, and using the said cooking liquor and the soda and sulphide content of the sulphide containing liquor for the cooking of wood and the like whereby to produce waste-liquor as first above specified.

6. The method of reusing soda and sulphur base chemicals for the cooking of wood and the like which comprises reducing waste-liquor to an ash containing sodium carbonate and sodium sulphide, dissolving the ash, carbonating the solution whereby insoluble sodium bicarbonate is formed, separating the sodium bicarbonate crystals from the sulphide containing liquor, sulphiting the sodium bicarbonate to form a sodium sulphite type of cooking liquor whereby the liquor is substantially free from sodium thiosulphate, treating the sulphide-containing liquor to form an alkaline sulphide-containing cooking liquor, separately cooking wood and the like with the two cooking liquors, and combining the waste-liquors of the two processes for supplying the waste liquor first above specified.

7. The method of reusing soda and sulphur base chemicals for the cooking of wood and the like which comprises reducing waste-liquor to an ash containing sodium carbonate and sodium sulphide, dissolving the ash, carbonating the solution whereby insoluble sodium bicarbonate is formed, separating the sodium bicarbonate crystals from the sulphide-containing liquor, sulphiting the sodium bicarbonate to form a sodium sulphite type of cooking liquor whereby the liquor is substantially free from sodium thiosulphate, causticizing the sulphide-containing liquor to form an alkaline sulphide-containing cooking liquor, separately cooking wood and the like with the two cooking liquors, and combining the waste liquors of the two processes for supplying the waste liquor first above specified.

In testimony whereof I have hereunto affixed my signature.

WALTER F. HOFFMAN.